United States Patent

Rios et al.

[11] Patent Number: 5,609,215
[45] Date of Patent: Mar. 11, 1997

[54] COMBINATION HOE AND PIVOTING RAKE TOOL

[76] Inventors: George C. Rios; M. Joyce Rios, both of 759 Rincon Rd., El Sarante, Calif. 94803

[21] Appl. No.: 642,917

[22] Filed: May 6, 1996

[51] Int. Cl.⁶ .................... A01B 1/22; A01C 5/02
[52] U.S. Cl. ........................ 172/373; 56/400.19
[58] Field of Search ............... 56/400.01, 400.04, 56/400.06, 400.18, 400.19; 172/371, 372, 374, 375, 373, 378

[56] References Cited

U.S. PATENT DOCUMENTS

| | | | |
|---|---|---|---|
| 820,601 | 5/1906 | Robinson | 172/373 |
| 987,008 | 3/1911 | McKibbin | 56/400.19 X |
| 999,930 | 8/1911 | Weisel | 172/373 |
| 1,272,567 | 7/1918 | Swan | 172/373 |
| 1,372,558 | 3/1921 | Saxl | 56/400.19 X |
| 2,008,073 | 7/1935 | Huntley | 56/400.19 X |
| 2,902,815 | 9/1959 | Gallo, Sr. | 50/400.19 |
| 4,054,313 | 10/1977 | Ciuci | 172/372 X |
| 5,185,992 | 2/1993 | Garcia | 172/375 X |
| 5,461,849 | 10/1995 | Allen | 56/400.06 |

*Primary Examiner*—Henry E. Raduazo
*Assistant Examiner*—Robert Pezzuto

[57] ABSTRACT

A combination hoe and pivoting rake tool including a handle. A hoe portion is dimensioned for coupling with an end of the handle. A central rake portion is secured to the hoe portion. The central rake portion has a plurality of teeth extending outwardly therefrom perpendicular to the hoe portion. A pair of outer rake portions each have a plurality of teeth extending downwardly therefrom. Each of the outer rake portions are pivotally coupled with one of opposing ends of the central rake portion. A pivoting mechanism is secured to a lower end portion of the handle and pivotally coupled with the pair of outer rake portions.

1 Claim, 3 Drawing Sheets

COMBINATION HOE AND PIVOTING RAKE TOOL

BACKGROUND OF THE INVENTION

1. Field of the Invention

The present invention relates to a combination hoe and pivoting rake tool and more particularly pertains to cultivating a ground area with multiple applications with a combination hoe and pivoting rake tool.

2. Description of the Prior Art

The use of garden tools is known in the prior art. More specifically, garden tools heretofore devised and utilized for the purpose of accomplishing garden tasks are known to consist basically of familiar, expected and obvious structural configurations, notwithstanding the myriad of designs encompassed by the crowded prior art which have been developed for the fulfillment of countless objectives and requirements.

By way of example, Kaufman U.S. Pat. No. 5,425,226 discloses a rake-hoe device of single piece construction.

Webb U.S. Pat. No. 5,003,760 discloses a garden tool.

Lidikay et al. U.S. Pat. No. Des. 274,116 discloses the ornamental design for a garden hoe and rake combination, or similar article.

Garcia U.S. Pat. No. Des. 352,874 discloses the ornamental design for a rake attachment for a hand hoe.

DeMarco U.S. Pat. No. 5,025,621 discloses a combination garden implement.

Roper U.S. Pat. No. Des. 293,875 discloses the ornamental design for a combined hoe and rake head assembly.

While these devices fulfill their respective, particular objective and requirements, the aforementioned patents do not describe a combination hoe and pivoting rake tool for cultivating a ground area with multiple applications.

In this respect, the combination hoe and pivoting rake tool according to the present invention substantially departs from the conventional concepts and designs of the prior art, and in doing so provides an apparatus primarily developed for the purpose of cultivating a ground area with multiple applications.

Therefore, it can be appreciated that there exists a continuing need for new and improved combination hoe and pivoting rake tool which can be used for cultivating a ground area with multiple applications. In this regard, the present invention substantially fulfills this need.

SUMMARY OF THE INVENTION

In the view of the foregoing disadvantages inherent in the known types of garden tools now present in the prior art, the present invention provides an improved combination hoe and pivoting rake tool. As such, the general purpose of the present invention, which will be described subsequently in greater detail, is to provide a new and improved combination hoe and pivoting rake tool and method which has all the advantages of the prior art and none of the disadvantages.

To attain this, the present invention essentially comprises a handle having a lower end portion and an upper end portion. The device includes a hoe portion having a sharpened lower edge and a rounded upper edge. The hoe portion has a cylindrical sleeve extending outwardly from the rounded upper edge in a generally perpendicular arrangement therewith. The cylindrical sleeve is dimensioned for receiving an end of the lower end portion of the handle therein. The device includes a central rake portion having an elongated bar. The elongated bar is secured to the rounded upper edge of the hoe portion. The elongated bar has a plurality of teeth extending outwardly therefrom in an opposite direction from the hoe portion. The device includes a pair of outer rake portions each having an elongated bar with a plurality of teeth extending downwardly therefrom. Each elongated bar has a securement portion extending upwardly from a distal portion thereof. Each of the outer rake portions is pivotally coupled with one of opposing ends of the elongated bar of the central rake portion. The device includes a pivoting mechanism comprising an elongated track having a vertical slot formed therein. The elongated track is secured to the lower end portion of the handle. A sliding member is coupled within the elongated track. The sliding member has a locking mechanism coupled therewith. The sliding member has a pair of wings extending outwardly of opposed side walls thereof. The pivoting mechanism has a pair of arms. The pair of arms have upper ends pivotally secured to the pair of wings and lower ends pivotally coupled with the securement portion of the elongated bars of the pair of outer rake portions.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination hoe and pivoting rake tool which has all the advantages of the prior art garden tools and none of the disadvantages.

It is another object of the present invention to provide a new and improved combination hoe and pivoting rake tool which may be easily and efficiently manufactured and marketed.

It is a further object of the present invention to provide a new and improved combination hoe and pivoting rake tool which is of durable and reliable construction.

An even further object of the present invention is to provide a new and improved combination hoe and pivoting rake tool which is susceptible of a low cost of manufacture with regard to both materials and labor, and which accordingly is then susceptible of low prices of sale to the consuming public, thereby making such a combination hoe and pivoting rake tool economically available to the buying public.

Still yet another object of the present invention is to provide a new and improved combination hoe and pivoting rake tool which provides in the apparatuses and methods of the prior art some of the advantages thereof, while simultaneously overcoming some of the disadvantages normally associated therewith.

Even still another object of the present invention is to provide a new and improved combination hoe and pivoting rake tool for cultivating a ground area with multiple applications.

Lastly, it is an object of the present invention to provide a new and improved combination hoe and pivoting rake tool including a handle. A hoe portion is dimensioned for coupling with an end of the handle. A central rake portion is secured to the hoe portion. The central rake portion has a plurality of teeth extending outwardly therefrom perpendicular to the hoe portion. A pair of outer rake portions each have a plurality of teeth extending downwardly therefrom. Each of the outer rake portions are pivotally coupled with one of opposing ends of the central rake portion. A pivoting mechanism is secured to a lower end portion of the handle and pivotally coupled with the pair of outer rake portions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
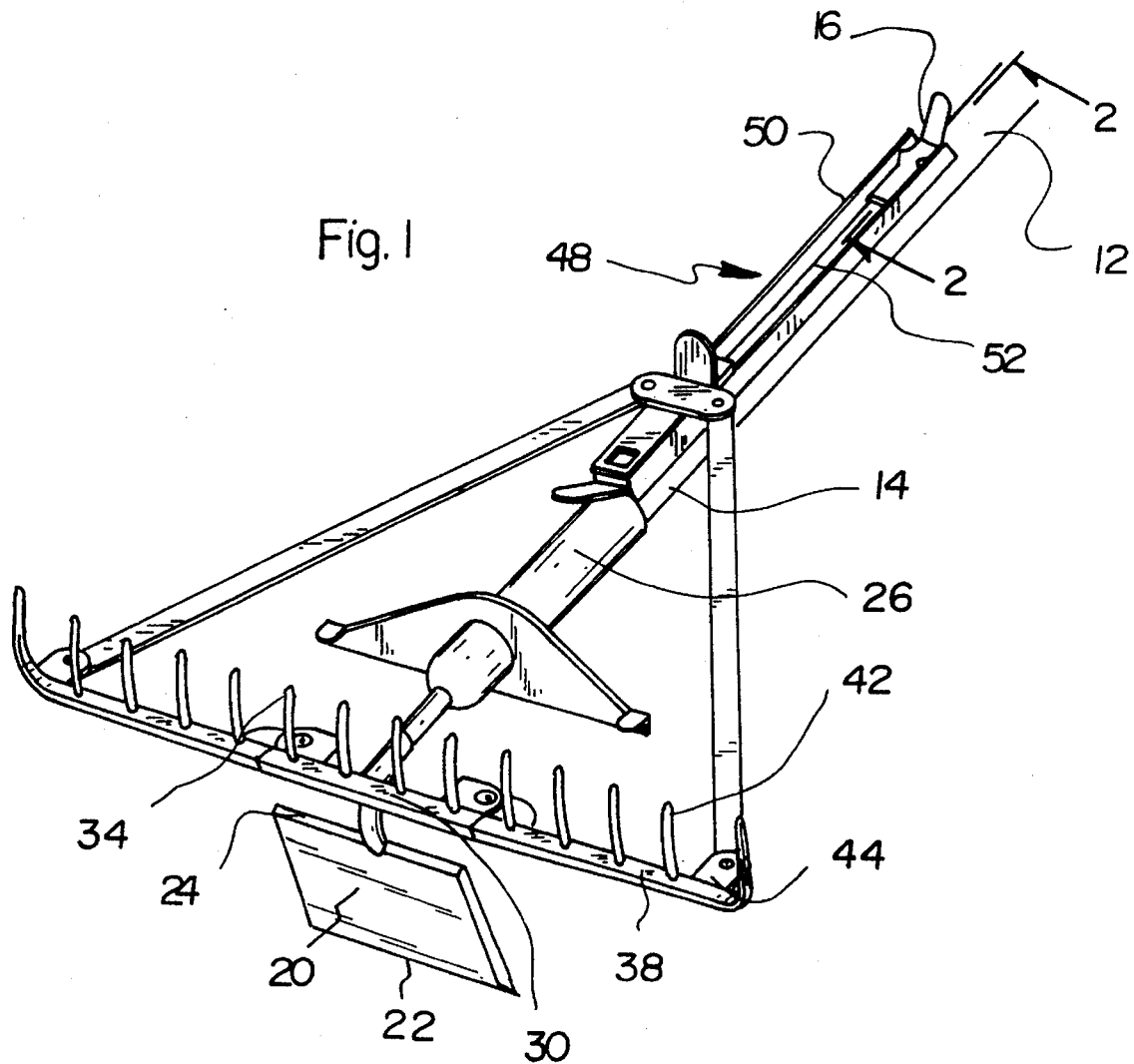
FIG. 1 is a perspective view of the preferred embodiment of the combination hoe and pivoting rake tool constructed in accordance with the principles of the present invention.
Figure 2:
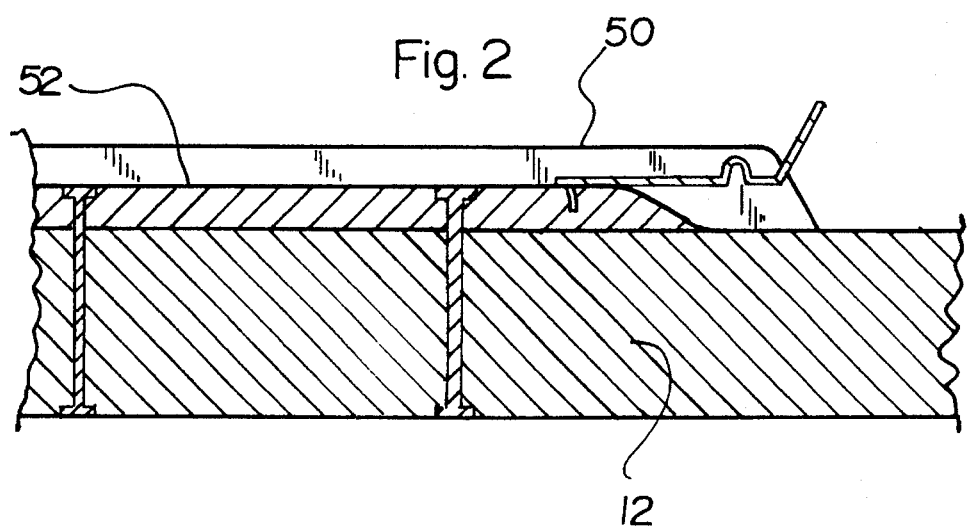
FIG. 2 is a cross-sectional view of the present invention as taken along line 2—2 of FIG. 1.
Figure 4:
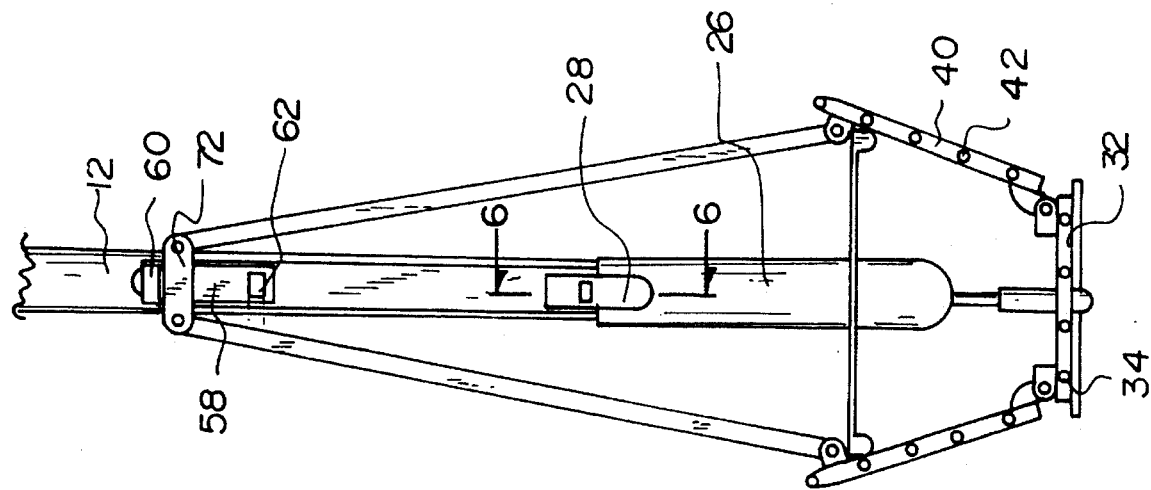
FIG. 4 is a sectional plan view of the present invention with the rake portion in a retracted configuration.
Figure 3:
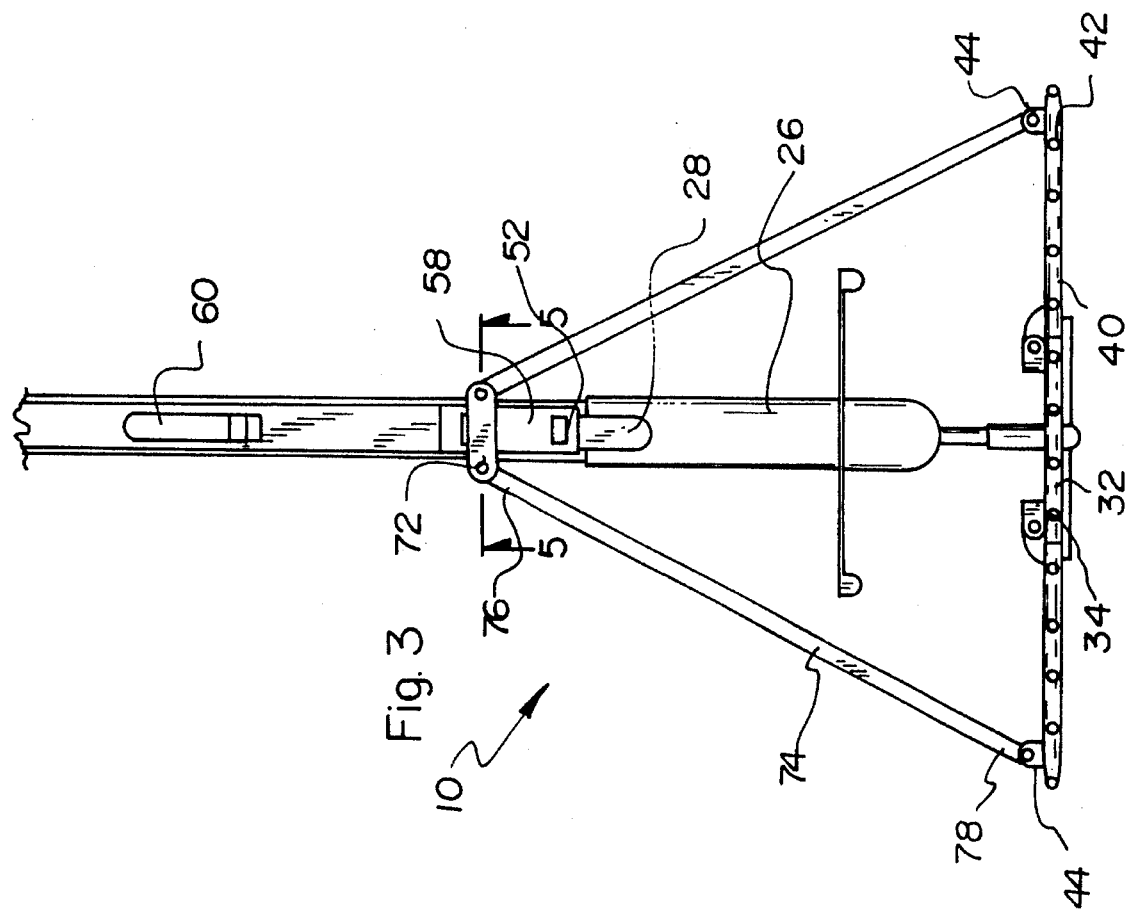
FIG. 3 is a sectional plan view of the present invention with the rake portion in an extended configuration.
Figure 5:
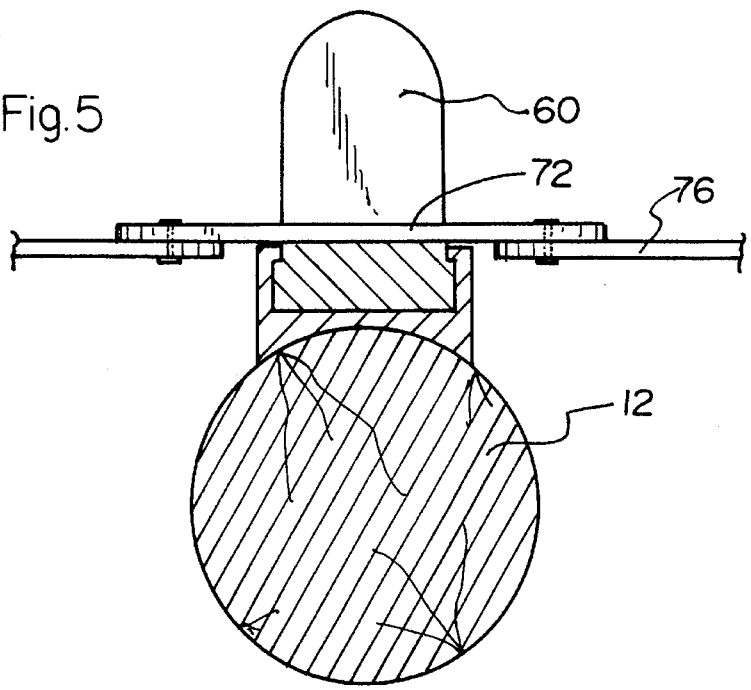
FIG. 5 is a cross-sectional view of the present invention as taken along line 5—5 of FIG. 3.
Figure 6:
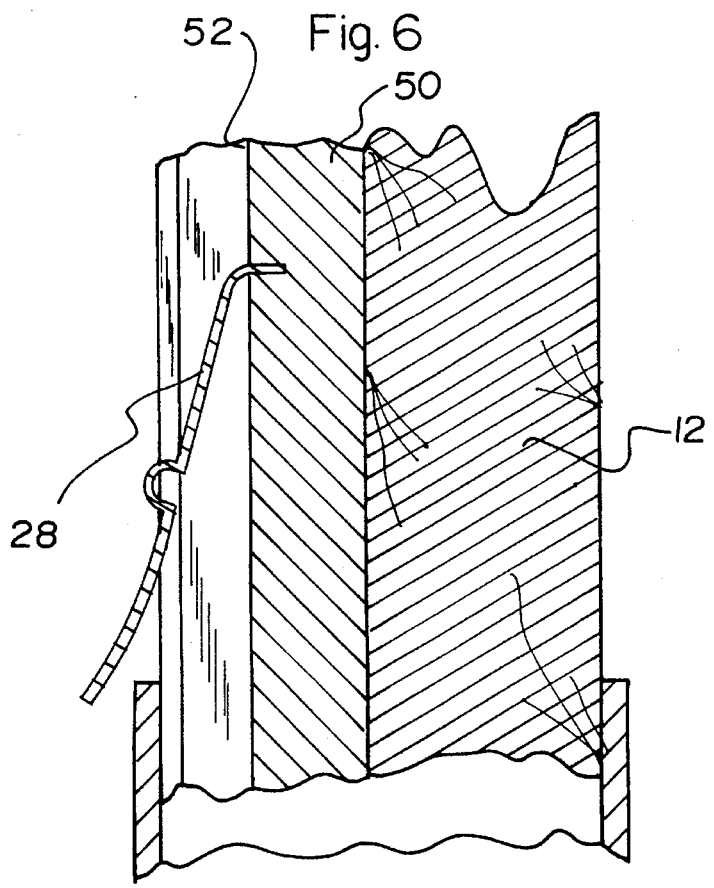
FIG. 6 is a cross-sectional view of the present invention as taken along line 6—6 of FIG. 4.

With reference now to the drawings, and in particular, to FIGS. 1–6 thereof, the preferred embodiment of the new and improved combination hoe and pivoting rake tool embodying the principles and concepts of the present invention and generally designated by the reference number 10 will be described.

Specifically, it will be noted in the various Figures that the device relates to a new and improved combination hoe and pivoting rake tool for cultivating a ground area with multiple applications. In its broadest context, the device consists of a handle, a hoe portion, a central rake portion, a pair of outer rake portions, and a pivoting mechanism. Such components are individually configured and correlated with respect to each other so as to attain the desired objective.

The device 10 includes a handle 12 having a lower end portion 14 and an upper end portion 16. The handle 12 is similar in construction to those used in the art having a cylindrical cross-section and a protective rounded upper end. The preferable construction of the handle 12 is wood.

Next, the device 10 includes a hoe portion 20 having a sharpened lower edge 22 and a blunt upper edge 24. The hoe portion 20 has a cylindrical sleeve 26 extending outwardly from the rounded upper edge 24 in a generally perpendicular arrangement therewith. The cylindrical sleeve 26 is dimensioned for receiving an end of the lower end portion 14 of the handle 12 therein. The sleeve 26 has a pivoting handle 28 disposed on an upper end thereof. The hoe portion 20 is preferably constructed of a rigid metal material.

The device 10 also includes a central rake portion 30 having an elongated bar 32. The elongated bar is of a length slightly less than a length of the hoe portion 20. The elongated bar 32 is secured to the rounded upper edge 24 of the hoe portion 20. The elongated bar 32 has a plurality of teeth 34 extending outwardly therefrom in an opposite direction from the sharpened lower edge 22 of the hoe portion 20. The central rake portion 30 is constructed of a material similar to the hoe portion 20.

Next, the device 10 includes a pair of outer rake portions 38 each having an elongated bar 40 with a plurality of teeth 42 extending downwardly therefrom. Each elongated bar 40 has a securement portion 44 extending upwardly from a distal portion thereof. Each of the outer rake portions 38 is pivotally coupled with one of opposing ends of the elongated bar 32 of the central rake portion 30. The pair of outer rake portions 38 can be pivoted upwardly to a position parallel with the handle 12 and perpendicular to the central rake portion 30.

Lastly, the device 10 includes a pivoting mechanism 48 comprising an elongated track 50 having a vertical slot 52 formed therein. The elongated track 50 is secured to the lower end portion 14 of the handle 12. A sliding member 58 is coupled within the elongated track 50. The sliding member 58 has a locking mechanism 60 coupled therewith. The sliding member 58 has an opening 62 formed in a lower end thereof. The opening 62 serves to engage the pivoting handle 28 of the cylindrical sleeve 26 to selectively lock the device in an extended configuration. The sliding member 58 has a pair of wings 72 extending outwardly of opposed side walls thereof. The pivoting mechanism 48 has a pair of arms 74. The pair of arms 74 have upper ends 76 pivotally secured to the pair of wings 74 and lower ends 78 pivotally coupled with the securement portion 44 of the elongated bars 40 of the pair of outer rake portions 38. The sliding member 58 can slide up or down within the vertical slot 52 thereby raising or lowering the pair of arms 74 which will raise or lower the pair of outer rake portions 38. The sliding member 58 can engage the locking mechanism 60 to orient the device 10 with the outer rake portions 38 in a retracted configuration.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A combination hoe and pivoting rake tool comprising, in combination:

a handle having a lower end portion and an upper end portion;

a hoe portion having a sharpened lower edge and a blunt upper edge, the hoe portion having a cylindrical sleeve extending outwardly from the blunt upper edge in a generally perpendicular arrangement therewith, the cylindrical sleeve dimensioned for receiving an end of the lower end portion of the handle therein, the sleeve having a pivoting handle disposed on an upper end thereof;

a central rake portion having an elongated bar, the elongated bar secured to the blunt upper edge of the hoe portion, the elongated bar having a plurality of teeth extending outwardly therefrom in an opposite direction from the sharpened lower edge of the hoe portion, the central rake portion facing in an opposite direction with respect to the hoe portion;

a pair of outer rake portions each having an elongated bar with a plurality of teeth extending downwardly therefrom, each elongated bar having a securement portion extending upwardly from a distal portion thereof, each of the outer rake portions pivotally coupled with one of opposing ends of the elongated bar of the central rake portion, the pair of outer rake portions facing in an opposite direction with respect to the hoe portion;

a pivoting mechanism comprising an elongated track having a vertical slot formed therein, the elongated track secured to the lower end portion of the handle, a sliding member coupled within the elongated track, the sliding member having a locking mechanism coupled with an upper end thereof, the sliding member having a pair of wings extending outwardly of opposed side walls thereof, the pivoting mechanism having a pair of arms, the pair of arms having upper ends pivotally secured to the pair of wings and lower ends pivotally coupled with the securement portion of the elongated bars of the pair of outer rake portions.

* * * * *